May 14, 1963 H. W. SHUMAKER 3,089,728
HORIZONTAL DEFLECTORS
Filed Nov. 17, 1961 2 Sheets-Sheet 1

INVENTOR.
HUGH W. SHUMAKER
BY
Robinson & Berry
ATTORNEYS

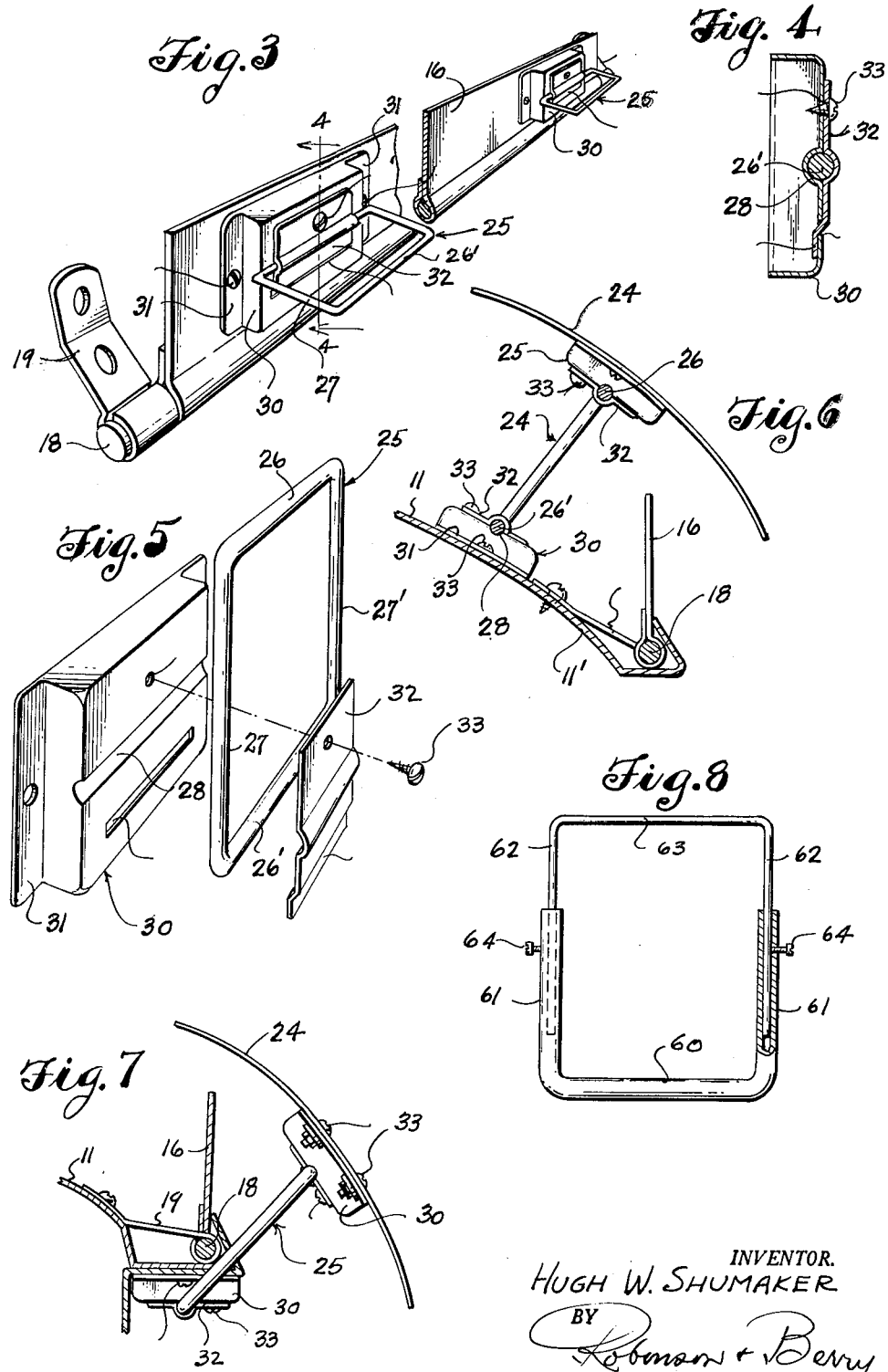

United States Patent Office 3,089,728
Patented May 14, 1963

3,089,728
HORIZONTAL DEFLECTORS
Hugh W. Shumaker, 517 S. Jackson, Moscow, Idaho
Filed Nov. 17, 1961, Ser. No. 153,047
7 Claims. (Cl. 296—91)

This invention relates to improvement in wind deflectors as designed for and as applied to motor vehicles, particularly as applied to automobiles of station wagon types for the deflecting of slip stream air currents downwardly across their back end windows to assist in keeping them clear of vision-obscuring substances including dust and rain; it being well known that the use of deflectors for this purpose is now well established.

This invention further relates to the application of what is herein designated to be an overflow preventing dam to serve in connection with the gutter as employed across the rear end or edge boundary of the vehicle top, to better serve its draining purpose, especially when a wind deflector is associated therewith.

It is the principal object of the present invention to provide a wind deflector that is adapted to be applied to and supported across the rear end of the vehicle top, above the rear end gutter and window and whereby slip stream air flowing rearwardly across the vehicle top will be deflected downwardly against and across the rear end window pane, and to so modify or improve the rain gutter structure that water caught therein will not be permitted to overflow or caused to be driven downwardly by the deflected slip stream air against the rear window to obscure, to greater extent, the driver's view through the rear window.

Yet another object of the present invention is to provide novel attachment means for the ordinary types of rain gutters as formed across the rear end edge of the top of a present day automobile, to prevent any overflow of water therefrom that would be detrimental to the driver's view through the rear window and furthermore, to provide wind deflectors with novel mountings that adapt them for proper adjustment in their positions of use with such overflow prevention means.

Further objects and advantages of this invention reside in the details of construction and combination of parts, as will hereinafter be fully described.

In accomplishing the above mentioned and other objects and advantages of this invention, I have provided the improved details of construction, the preferred forms of which are illustrated in the accompanying drawings, wherein:

FIG. 3 is a perspective view of the present gutter dam as designed for application to the usual type of rear edge rain gutter to prevent overflow of water across its back edge.

FIG. 4 is an enlarged sectional detail taken through the mounting base of a link mounting for the deflector plate; the section being on line 6—6 in FIG. 3.

FIG. 5 is an exploded view in perspective, of the parts of one of the deflector plate mounting hinge link bases shown in FIG. 3.

FIG. 6 is a vertical, cross-section through a rain gutter and portion of the vehicle top showing the means for and manner of mounting a wind deflector forwardly of the rain gutter.

FIG. 7 is a similar view showing another mounting location for the wind deflector supporting means.

FIG. 8 is a view showing a form of extendable and retractable deflector mounting hinge link.

Figure 1:
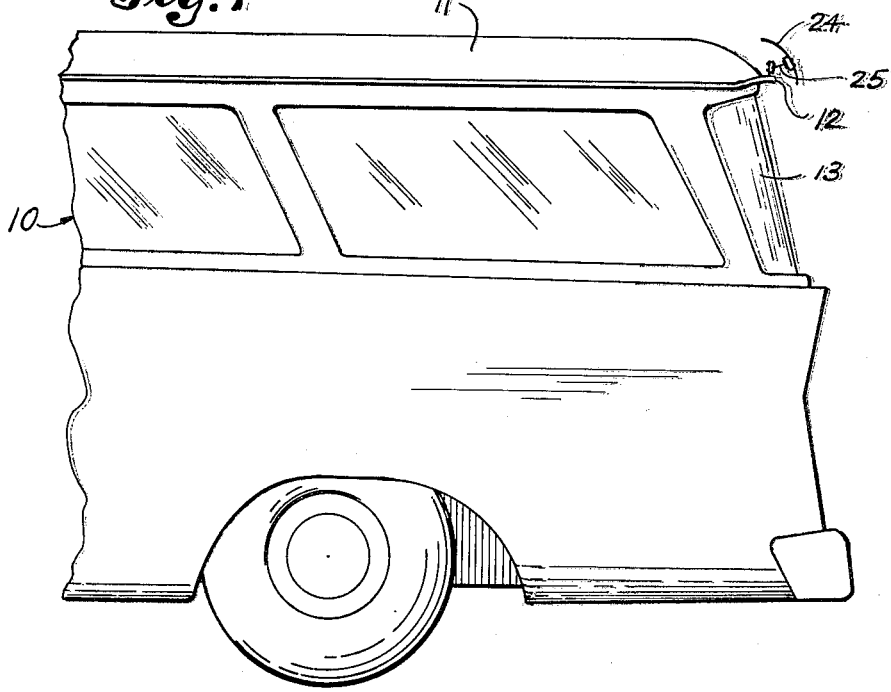
FIG. 1 is a side view of a present day automobile of station wagon type, that is equipped with a rain gutter dam and wind deflector combination embodied by the present invention.
Figure 2:
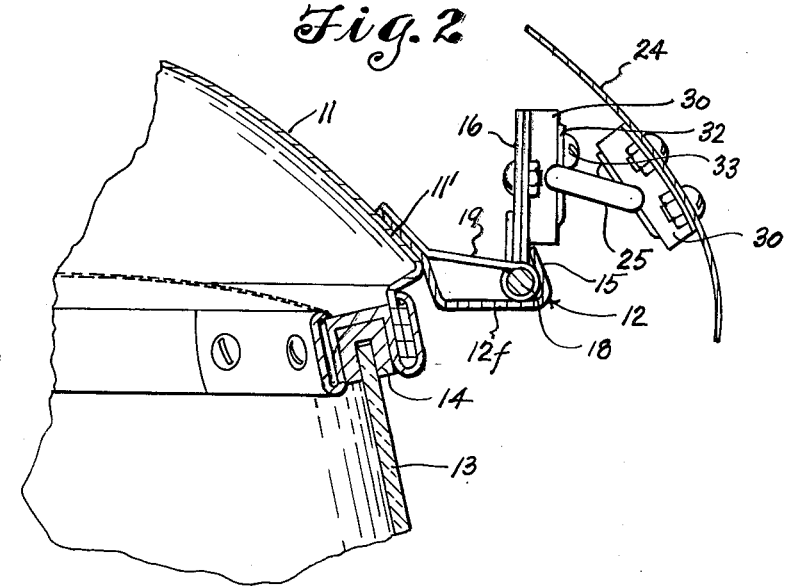
FIG. 2 is an enlarged vertical sectional view of the rear end portion of the automobile top, showing the wind deflector and gutter dam of the present invention, as used in combination on the vehicle.

Referring more in detail to the drawings:

In FIG. 1, 10 designates a common station type or model of automotive vehicle having the usual sheet metal roof or top 11 that terminates at the rear end of the vehicle body, above and across the rear end window, in a rain gutter designated therein generally by reference numeral 12. This gutter as shown in cross-section in FIG. 2, is equipped with a dam embodying the improvements of the present invention therein, to prevent overflow of water onto the glass pane 13 of the rear end of the body. FIG. 2 shows the glass pane 13 to be mounted for vertical sliding adjustment and is adapted to be closed at its top edge against a joint sealing strip 14 of rubber or the like that is secured in the window frame structure.

The rain gutter 12, as provided across the rear end edge of the top 11 is formed in part by the downwardly sloping rear end portion 11' of the metal top 11 which terminates in a rearwardly directed horizontal bottom 12f and an upwardly directed flange 15 that extend straight across the top of the window opening. This particular flange 15 is shown in FIG. 2 to be somewhat forwardly and upwardly inclined to better serve the purpose of the rear edge wall of the gutter. It is to be understood that the opposite end portions of this rear end gutter 12 slope downwardly and may join in the usual way with the opposite side edge gutters, as shown in FIG. 1, or may open to discharge directly to the sides of the vehicle body.

That particular construction seen in FIG. 2, which shows the gutter 12 to be of substantial depth, is designed to eliminate the possibility of overflow of water therefrom that may be experienced when a vehicle is traveling forwardly in a heavy rain. Such overflow, if spilled onto the rear window 13 will result in obscuring the driver's rear view through the window. Such view would be even more obscured if the overlow is caused to be directed to greater extent against the window by reason of the use therewith of a wind deflector mounted as shown in FIG. 2.

In FIG. 2 it has been well shown that the gutter 12 is equipped with an overflow stop or dam 16 in the form of a flat elongated metal plate disposed therein and extending substantially its full length and projecting a substantial distance above its rear flange 15. This dam is equipped along its lower edge with a mounting rod 18 which projects at its ends beyond the ends of the dam forming strip. This rod is equipped at its ends with mounting brackets 19—19 that are rigidly attached to the car top by screws 20. This strip 16 lies flatly against and extends upwardly across the top edge portion of the trough as an upward extension of its wall 15 thus to prevent overflow of water from the trough regardless of the amount of rain falling or the force of the slip stream.

It is shown in FIG. 2 that a wind deflector 24 is supported from the back side of the dam 16 by two or more supporting brackets, each of which comprises an open rectangular link 25 formed with upper and lower end cross-members 26—26' and opposite side members 27—27'. The cross-members of these links are pivotally seated in cross-channels 28 formed in die stamped metal bases 30 flanged at their ends as at 31 for their fixed securement. One of these bases of each bracket is fixed to the back face of the dam plate 16 and the other is fixed to the undersurface of the deflector plate 24. The link ends are held in their seats by overlying plates 32 secured to the bases by screws 33.

The pivotal mountings of the deflector plate as above described permits the deflector to be pivotally adjusted to various positions as may be required or desired to direct more or less of the slip stream air downwardly across the rear window pane 13.

Alternative places of attachment of the deflector plate 24 have been shown in FIGS. 6 and 7. In FIG. 6 it has been shown that the lower ends of link 25—25' are mounted by bases 30 that are applied directly to the car top 11 forwardly of the gutter 12, to support the deflector above and across the top edge of the gutter and dam 16.

In FIG. 7, it has been shown that the lower ends of the links 25—25' are mounted by bases 30 that are applied to the underside of the bottom wall of the gutter 12.

In the various methods and means for the application of the deflector plate 24 to the vehicle, the bases 30 and links are substantially alike as are also the deflector plates 24.

It can be readily understood by reference to the detailed construction herein shown, particularly in FIG. 2, that the rear wall 15 of the rain gutter 12 and dam 16 as applied to the gutter will prevent rain from overflowing and being blown by the slip stream air against the window 13. It will further be understood that the slip stream air, as downwardly directed by the deflector 24 will resist and destroy the suction created immediately back of the rear window and will maintain its function of keeping the window clear when driving in or during adverse weather conditions.

The curvature required or desired of plate 24 and the position of the plate relative to the rear end gutter is generally established by experimentation. Its means of securement may be varied to suit different vehicle construction and various conditions of use.

FIG. 8 illustrates plate mounting links that are adjustable in length. In this form each link comprises a tubular inner end portion forming a cross-member 60 and opposite side legs 61—61 in which the opposite side legs 62—62 of an outer end member 63 are telescopically adjustable and adapted to be held at different positions by the tightening of set screws 64 applied as shown.

What I claim as new is:

1. An attachment device for an automobile having a rain gutter extending across the back end of the automobile top and a back window in the automobile below said rain gutter, said rain gutter including a horizontal portion and an integral vertical wall portion spaced from the top, said attachment device comprising a vertically disposed and horizontally elongated dam plate positioned in said rain gutter between the top of the automobile and said vertical wall portion, said dam plate extending above said vertical wall portion and across substantially the entire width of the window and a wind deflector horizontally disposed and mounted in spaced relationship above said dam plate and the top of the automobile.

2. An attachment device as in claim 1 wherein said extension wall is adjustably mounted.

3. An attachment device as in claim 1 wherein said wind deflector is adjustably mounted.

4. An attachment device as in claim 3 wherein said wind deflector is mounted on said extension wall.

5. An attachment device as in claim 1 wherein said wind deflector is secured to said rain gutter below said extension wall.

6. An attachment device as in claim 1 including an adjustable mounting means for mounting said wind deflector, said mounting means including a base, a link pivotally secured at one end to said base and secured at its other end to said wind deflector.

7. An attachment device as in claim 6 wherein said link is adjustable in length.

References Cited in the file of this patent

UNITED STATES PATENTS

| | | |
|---|---|---|
| 1,797,792 | Potter | Mar. 24, 1931 |
| 2,919,952 | Riddle et al. | Jan. 5, 1960 |
| 2,933,344 | Shumaker | Apr. 19, 1960 |
| 3,015,518 | Nelson | Jan. 2, 1962 |